(12) United States Patent
Noda et al.

(10) Patent No.: US 8,274,804 B2
(45) Date of Patent: Sep. 25, 2012

(54) VOLTAGE TRANSFORMING APPARATUS

(75) Inventors: Toshihiro Noda, Chiyoda-ku (JP);
Tetsuya Matsuda, Chiyoda-ku (JP);
Hiroshi Kiuchi, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 313 days.

(21) Appl. No.: 12/744,264

(22) PCT Filed: Mar. 4, 2008

(86) PCT No.: PCT/JP2008/053822
§ 371 (c)(1),
(2), (4) Date: May 21, 2010

(87) PCT Pub. No.: WO2009/110061
PCT Pub. Date: Sep. 11, 2009

(65) Prior Publication Data
US 2010/0284205 A1    Nov. 11, 2010

(51) Int. Cl.
*H02J 3/01* (2006.01)
*H02M 7/42* (2006.01)

(52) U.S. Cl. ............... 363/39; 363/15; 363/37; 307/11; 307/82

(58) Field of Classification Search ............ 363/15, 363/16, 17, 34, 36, 37, 39, 123; 307/9.1, 307/11, 12, 13, 16, 17, 29, 38, 82; 180/65.1, 180/65.31; 323/267; 191/10
See application file for complete search history.

(56) References Cited

U.S. PATENT DOCUMENTS

| 5,669,470 | A | * | 9/1997 | Ross | 191/10 |
| 5,670,851 | A | * | 9/1997 | Numazaki | 318/106 |
| 6,075,717 | A | * | 6/2000 | Kumar et al. | 363/87 |
| 6,097,181 | A | * | 8/2000 | Russo | 323/360 |
| 6,239,999 | B1 | * | 5/2001 | Mai | 363/125 |
| 7,622,825 | B2 | * | 11/2009 | Brune et al. | 307/82 |

(Continued)

FOREIGN PATENT DOCUMENTS

JP          60-030112 A        2/1985
(Continued)

OTHER PUBLICATIONS

International Search Report for PCT/JP2008/053822, mailed Jun. 17, 2008.

*Primary Examiner* — Gary L Laxton
(74) *Attorney, Agent, or Firm* — Buchanan Ingersoll & Rooney PC

(57) ABSTRACT

A voltage transforming apparatus includes a first high voltage side coil, a first low voltage side coil magnetically coupled to the first high voltage side coil, a second low voltage side coil magnetically coupled to the first high voltage side coil, and a first switch switching an externally supplied voltage between being supplied to the first low voltage side coil and the second low voltage side coil and being supplied to the first high voltage side coil. The first low voltage side coil and the second low voltage side coil are provided such that a magnetic flux that is generated by current flowing through the first low voltage side coil and a magnetic flux that is generated by current flowing through the second low voltage side coil cancel each other out when a voltage is supplied via the first switch.

6 Claims, 8 Drawing Sheets

U.S. PATENT DOCUMENTS 7,764,527 B2 * 7/2010 Takayanagi ............... 363/65
2010/0176655 A1 * 7/2010 Yokozutsumi ............ 307/9.1

FOREIGN PATENT DOCUMENTS

| JP | 61-032506 A | 2/1986 |
| JP | 01-155607 A | 6/1989 |
| JP | 02-200377 A | 8/1990 |
| JP | 03-038807 A | 2/1991 |
| JP | 11-262104 A | 9/1999 |
| JP | 11-273975 A | 10/1999 |

* cited by examiner (a)

(b)

VOLTAGE TRANSFORMING APPARATUS

TECHNICAL FIELD

The present invention relates to a voltage transforming apparatus, and particularly to a voltage transforming apparatus to be installed on an electric railcar that can run both in an AC section and in a DC section.

BACKGROUND ART

There has been developed an AC/DC electric railcar that can run both in an AC section where an AC voltage is supplied from, for example, an overhead wire, and in a DC section where a DC voltage is supplied from, for example, an overhead wire. Some conventional electric railcars may, for example, have a structure in which a reactor is arranged singly and separately from a transformer, and some may have a structure in which a transformer and a reactor are accommodated in a single-piece tank. In such AC/DC electric railcars, however, an apparatus for an AC section, such as a transformer, cannot be used in a DC section, and to the contrary, an apparatus for a DC section, such as a reactor, cannot be used in an AC section. Consequently, both of the apparatus for an AC section and the apparatus for a DC section are needed, however, there may be the difficulty in equipping such an AC/DC electric railcar with both of the apparatuses in the limited space, such as under the floor of a carbody.

Here, Japanese Patent Laying-Open No. 03-038807 discloses a shared shunt reactor type transformer unifying a transformer and a shunt reactor, which is formed of a bypass core provided at a portion of a yoke of the transformer and a gapped core and a reactor coil provided within the space surrounded by the portion of the yoke and the bypass core. Further, the bypass core forms a yoke of the reactor, as well as the winding direction of a coil of the transformer and the winding direction of a coil of the shunt reactor are directed such that the transformer magnetic flux in the portion of the yoke and the reactor magnetic flux cancel each other out.

Further, Japanese Patent Laying-Open No. 11-273975 discloses a common mode choke coil that is formed of first, second, third, and fourth coils of edgewise-wound rectangular wires, and a magnetic core forming a closed magnetic path in the shape of a hollow square. Further, the first and second coils are arranged at one magnetic leg of the magnetic core, the third and fourth coils are arranged at the other opposite magnetic leg, and the first and third coils as well as the second and fourth coils are connected in series. Line current cancels the magnetic fluxes generated at the first and second coils, the second and third coils, the third and fourth coils, the fourth and first coils, and urges the magnetic fluxes generated at the first and third coils and the second and fourth coils each other. Furthermore, the winding direction of each coil is set so that the respective magnetic fluxes generated at the first, second, third, and fourth coils are urged by current flowing in the same direction, the first and fourth coils are arranged in parallel, and the second and third coils are arranged in parallel.

Patent Document 1: Japanese Patent Laying-Open No. 03-038807
Patent Document 2: Japanese Patent Laying-Open No. 11-273975

SUMMARY OF THE INVENTION

Problems to be Solved by the Invention

In the configuration described in Japanese Patent Laying-Open No. 03-038807, however, a transformer and a reactor operate individually and, in the configuration described in Japanese Patent Laying-Open No. 11-273975, a common mode choke coil does not have a transformer function. Further, the dimension and the mass of a transformer to be installed on an electric railcar, which account for a large proportion of an apparatus for an AC section, degrade the performance of the electric railcar, because, in a DC section, the transformer is unable to be used and thus becomes a mere load.

Therefore, an object of the present invention is to provide, in an AC/DC electric railcar, a voltage transforming apparatus that operates in an AC section as a transformer, which is an apparatus for an AC section, and operates in a DC section as a reactor, which is an apparatus for a DC section, thereby to enable the equipping space of a carbody to be reduced.

Means for Solving the Problems

A voltage transforming apparatus according to an aspect of the present invention includes a first high voltage side coil, a first low voltage side coil magnetically coupled to the first high voltage side coil, a second low voltage side coil magnetically coupled to the first high voltage side coil, and a first switch switching an externally supplied voltage between being supplied to the first low voltage side coil and the second low voltage side coil and being supplied to the first high voltage side coil. The first low voltage side coil and the second low voltage side coil are provided such that a magnetic flux generated by current flowing through the first low voltage side coil and a magnetic flux generated by current flowing through the second low voltage side coil cancel each other out when a voltage is supplied via the first switch.

EFFECTS OF THE INVENTION

The present invention in an AC/DC electric railcar can reduce the equipping space of a carbody by operating in an AC section as a transformer, which is an apparatus for an AC section, and by operating in a DC section as a reactor, which is an apparatus for a DC section. Further, a steady output can be obtained both in an AC section and in a DC section.

BRIEF DESCRIPTION OF THE DRAWINGS

FIG. 6 (b) is a graph showing leakage fluxes generated within a core in an AC section.

FIG. 11 (b) is a graph showing leakage fluxes generated within a core in a DC section.

FIG. 14 (b) is a graph showing leakage fluxes generated within a core in a DC section.

Figure 1:
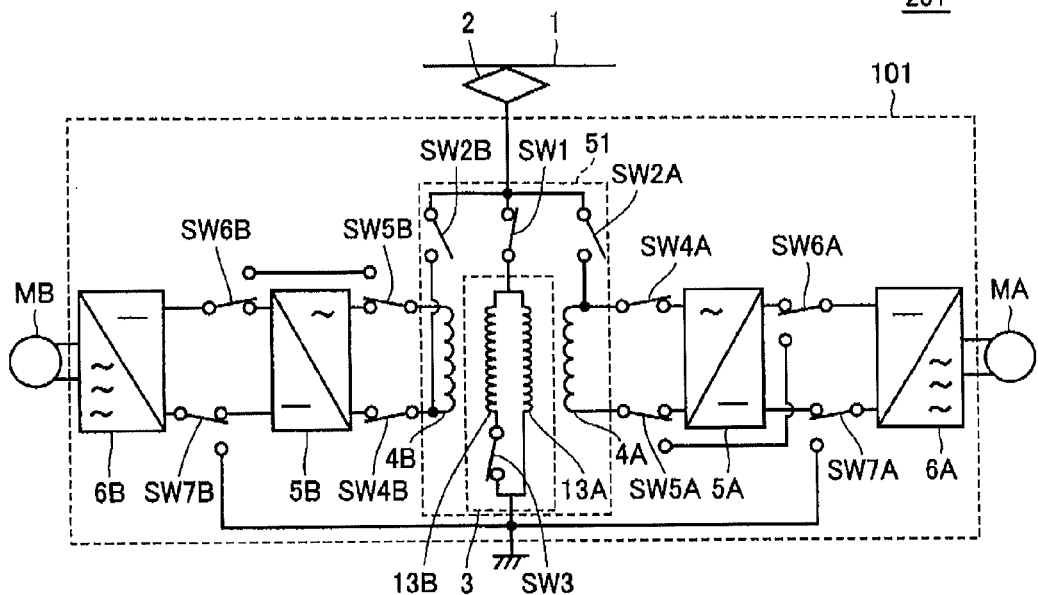
FIG. 1 is a circuit diagram illustrating a configuration of an AC/DC electric railcar according to an embodiment of the present invention.

DESCRIPTION OF THE REFERENCE SIGNS 1 overhead wire, 2 pantograph, 3 high voltage side coil, 4A, 4B low voltage side coil, 5A, 5B converter, 6A, 6B inverter, 13A, 13B high voltage side coil, 14 core, 51 transformer, 101 voltage transforming apparatus, 201 AC/DC electric railcar, SW1, SW2A, SW2B, SW3, SW4A, SW4B, SW5A, SW5B, SW6A, SW6B, SW7A, SW7B switch, W1, W2 window portion.

BEST MODES FOR CARRYING OUT THE INVENTION

An embodiment of the present invention will be described hereinafter with reference to the drawings. In the drawings, the same or corresponding elements have the same reference characters allotted, and description thereof will not be repeated.

Configuration and Basic Operation

FIG. 1 is a circuit diagram illustrating a configuration of an AC/DC electric railcar according to an embodiment of the present invention.

Referring to FIG. 1, an AC/DC electric railcar 201 includes a pantograph 2, a voltage transforming apparatus 101, and motors MA and MB. Voltage transforming apparatus 101 includes a transformer 51, converters 5A, 5B, inverters 6A, 6B, and switches SW4A, SW4B, SW5A, SW5B, SW6A, SW6B, SW7A, SW7B. Transformer 51 includes a high voltage side coil 3, low voltage side coils 4A, 4B, and switches SW1, SW2A, SW2B, SW3. High voltage side coil 3 includes high voltage side coils 13A, 13B.

Pantograph 2 is connected to an overhead wire 1. Switch SW1 has a first end connected to pantograph 2 and a second end connected to a first end of high voltage side coil 13A and a first end of high voltage side coil 13B. Switch SW2A has a first end connected to pantograph 2 and a second end connected to a first end of low voltage side coil 4A. Switch SW2B has a first end connected to pantograph 2 and a second end connected to a second end of low voltage side coil 4B. Switch SW3 has a first end connected to a second end of high voltage side coil 13A and a second end connected to a second end of high voltage side coil 13B.

Switch SW4A has a first end connected to the first end of low voltage side coil 4A and a second end connected to a first input terminal of converter 5A. Switch SW4B has a first end connected to the second end of low voltage side coil 4B and a second end connected to a second input terminal of converter 5B. Switch SW5A has a first end connected to a second end of low voltage side coil 4A, a second end connected to a second input terminal of converter 5A, and a third end. Switch SW 5B has a first end connected to a first end of low voltage side coil 4B, a second end connected to a first input terminal of converter 5B, and a third end. Switch SW6A has a first end connected to a first output terminal of converter 5A, a second end connected to a first input terminal of inverter 6A, and a third end connected to the third end of switch SW5A. Switch SW6B has a first end connected to a first output terminal of converter 5B, a second end connected to a first input terminal of inverter 6B, and a third end connected to the third end of switch SW5B. Switch SW7A has a first end connected to a second output terminal of converter 5A, a second end connected to a second input terminal of inverter 6A, and a third end connected to a ground node to which a ground voltage is supplied. Switch SW7B has a first end connected to a second output terminal of converter 5B, a second end connected to a second input terminal of inverter 6B, and a third end connected to the ground node to which the ground voltage is supplied.

Figure 2:
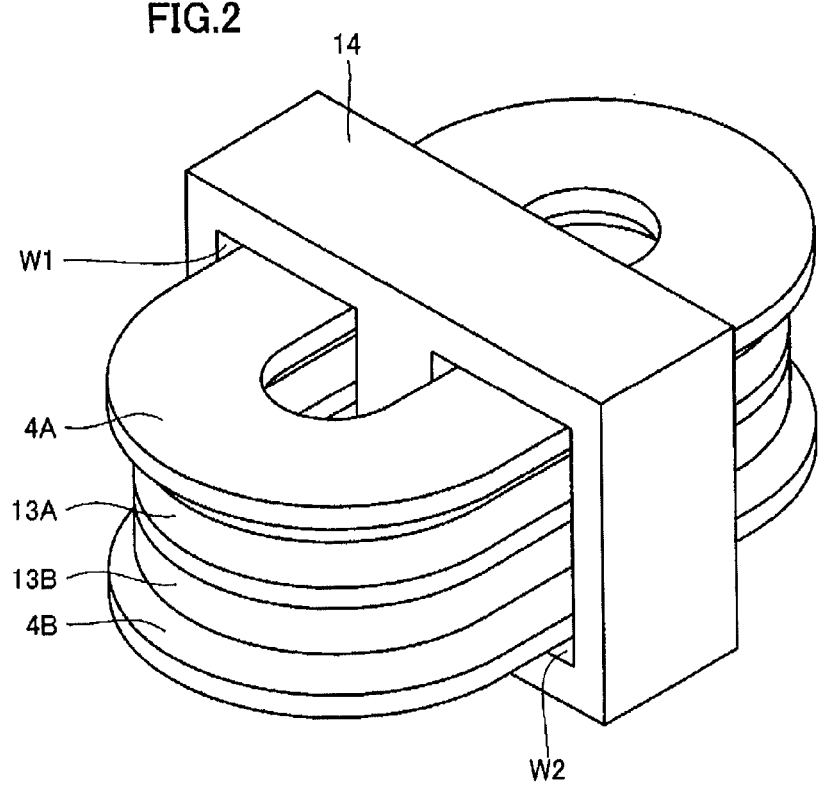
FIG. 2 is a perspective view illustrating a configuration of a voltage transforming apparatus according to an embodiment of the present invention.

FIG. 2 is a perspective view illustrating a configuration of a voltage transforming apparatus according to an embodiment of the present invention.

Referring to FIG. 2, voltage transforming apparatus 101 further includes a core 14, Core 14 has first and second sides opposing each other and window portions W1 and W2 passing through from the first side to the second side.

High voltage side coils 13A and 13B and low voltage side coils 4A and 4B are wound around in such a manner that they run through window portions W1 and W2.

High voltage side coil 13A is provided at a position between low voltage side coil 4A and low voltage side coil 4B and opposite to low voltage side coil 4A, and magnetically coupled to low voltage side coil 4A.

High voltage side coil 13B is connected in parallel to high voltage side coil 13A, provided at a position between low voltage side coil 4A and low voltage side coil 4B and opposite to low voltage side coil 4B, and magnetically coupled to low voltage side coil 4B.

Referring again to FIG. 1, switches SW1, SW2A and SW2B switch the voltage supplied via pantograph 2 from overhead wire 1 between being supplied to low voltage side coil 4A and low voltage side coil 4B and being supplied to high voltage side coils 13A and 13B.

Switch SW3 is connected between high voltage side coil 13A and high voltage side coil 13B and switches a closed circuit including high voltage side coil 13A and high voltage side coil 13B between being formed and not being formed.

Converter 5A converts an AC voltage appearing on low voltage side coil 4A into a DC voltage. Converter 5B converts an AC voltage appearing on low voltage side coil 4B into a DC voltage.

Switches SW4A and SW5A switch low voltage side coil 4A between being connected to converter 5A and being connected via switch SW6A to inverter 6A. Switches SW4B and SW5B switch low voltage side coil 4B between being connected to converter 5B and being connected via switch SW6B to inverter 6B.

Inverter 6A converts a DC voltage received from converter 5A or a DC voltage received via switch SW5A from low voltage side coil 4A into a three-phase AC voltage, and outputs it to motor MA. Inverter 6B converts a DC voltage received from converter 5B or a DC voltage received via switch SW5B from low voltage side coil 4B into a three-phase AC voltage, and outputs it to motor MB.

Motor MA is driven based on the three-phase AC voltage received from inverter 6A. Motor MB is driven based on the three-phase AC voltage received from inverter 6B.

Operation

An operation of the voltage transforming apparatus according to an embodiment of the present invention in an AC section will now be described.

Referring to FIG. 1, in an AC section, switch SW1 turns on, switches SW2A and SW2B turn off, switch SW3 turns on, and switches SW4A and SW4B turn on. Further, the first terminals and the second terminals of switches SW5A, SW5B, SW6A, SW6B, SW7A, and SW7B are respectively connected.

Figure 3:
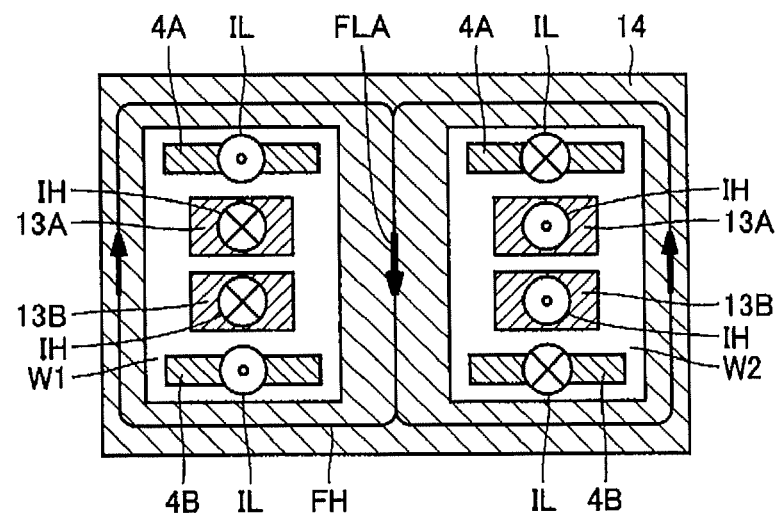
FIG. 3 is a sectional view of a transformer illustrating current and magnetic fluxes generated in an AC section.

FIG. 3 is a sectional view of a transformer illustrating current and magnetic fluxes generated in an AC section.

First, an AC voltage is supplied from overhead wire 1 to pantograph 2. The AC voltage supplied from overhead wire 1 is applied to high voltage side coils 13A and 13B via pantograph 2 and switch SW1. Then, AC current IH flows through high voltage side coils 13A and 13B each.

Figure 4:
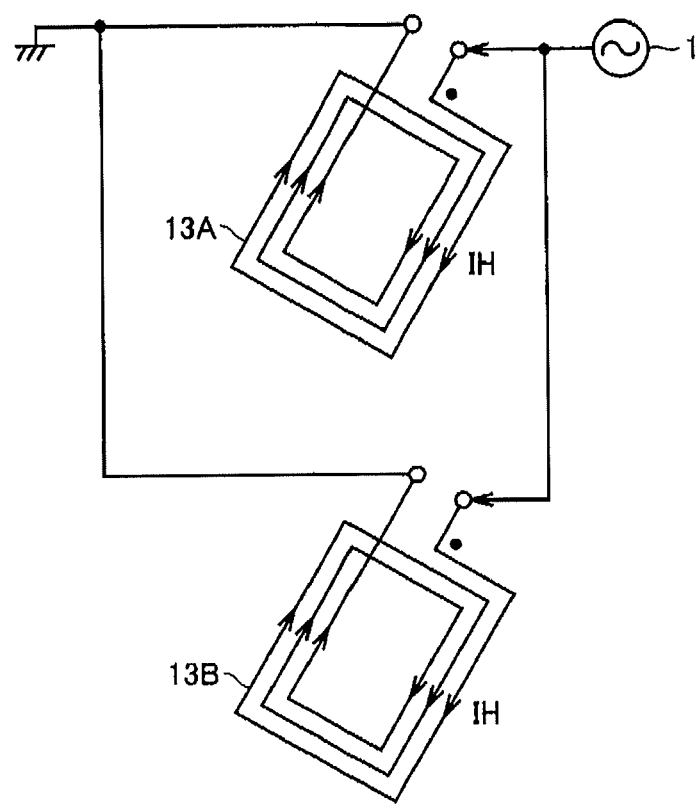
FIG. 4 schematically illustrates the direction of current flowing through a high voltage side coil due to an AC voltage supplied from an overhead wire in an AC section.

FIG. 4 schematically illustrates the direction of current flowing through a high voltage side coil due to an AC voltage supplied from an overhead wire in an AC section. FIG. 4 illustrates the case where high voltage side coils 13A and 13B have the same winding direction.

Figure 5:
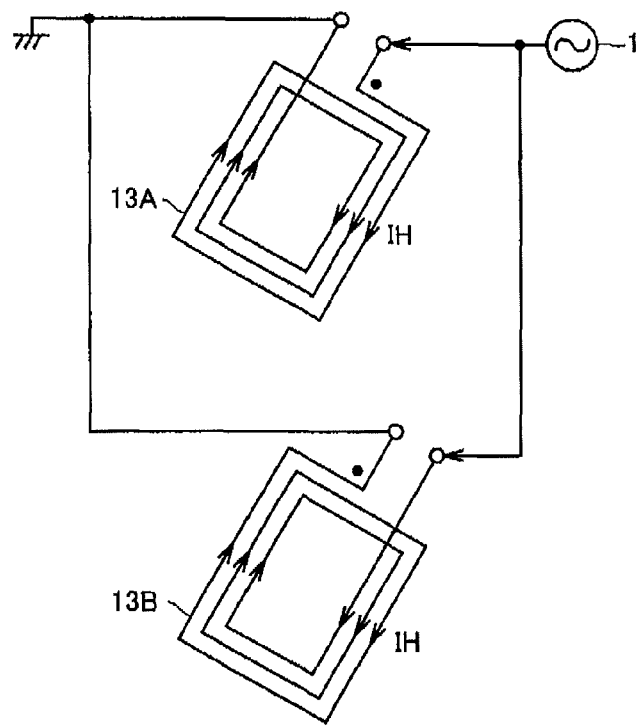
FIG. 5 schematically illustrates the direction of current flowing through a high voltage side coil due to an AC voltage supplied from the overhead wire in an AC section.

FIG. 5 schematically illustrates the direction of current flowing through a high voltage side coil due to an AC voltage supplied from the overhead wire in an AC section. FIG. 5 illustrates the case where high voltage side coils 13A and 13B have the opposite winding directions.

In either cases of FIGS. 4 and 5, high voltage side coils 13A and 13B are provided such that the magnetic flux generated by current flowing through high voltage side coil 13A when a voltage is supplied from overhead wire 1 via switch SW1 and the magnetic flux generated by current flowing through high voltage side coil 13B when a voltage is supplied from overhead wire 1 via switch SW1 are in the same direction.

Referring again to FIG. 3, AC current IH causes a main magnetic flux FH to be generated within core 14. Then, main magnetic flux FH causes AC current IL and an AC voltage that depend on the ratio between the number of turns of low voltage side coil 4A and the number of turns of high voltage side coil 13A to be generated at low voltage side coil 4A. Further, main magnetic flux FH causes AC current IL and an AC voltage that depend on the ratio between the number of turns of low voltage side coil 4B and the number of turns of high voltage side coil 13B to be generated at low voltage side coil 4B.

Here, since the number of turns of low voltage side coils 4A and 4B is smaller than the number of turns of high voltage side coils 13A and 13B, respectively, an AC voltage, which is stepped down from the AC voltage applied to high voltage side coils 13A and 13B, appears on low voltage side coils 4A and 4B, respectively.

The AC voltage appearing on low voltage side coil 4A is supplied to converter 5A via switches SW4A and SW5A. Further, the AC voltage appearing on low voltage side coil 4B is supplied to converter 5B via switches SW4B and SW5B.

Converter 5A converts the AC voltage supplied from low voltage side coil 4A into a DC voltage, and outputs it via switches SW6A and SW7A to inverter 6A. Further, converter 5B converts the AC voltage supplied from low voltage side coil 4B into a DC voltage, and outputs it via switches SW6B and SW7B to inverter 6B.

Inverter 6A converts the DC voltage received from converter 5A into a three-phase AC voltage, and outputs it to motor MA. Further, inverter 6B converts the DC voltage received from converter 5B into a three-phase AC voltage, and outputs it to motor MB.

Motor MA rotates based on the three-phase AC voltage received from inverter 6A. Further, motor MB rotates based on the three-phase AC voltage received from inverter 6B.

Figure 6:
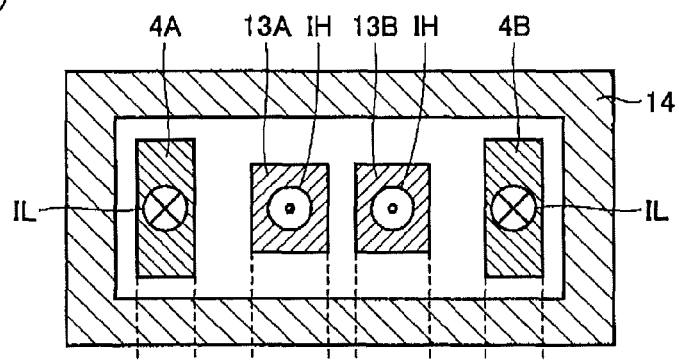
FIG. 6 (a) is a sectional view of a window portion of a transformer illustrating current generated in an AC section.
Figure 6:
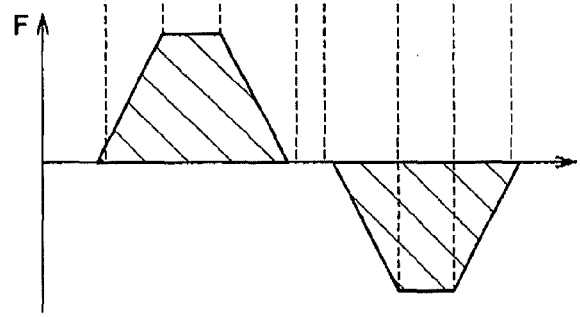

FIG. 6 (a) is a sectional view of a window portion of a transformer illustrating current generated in an AC section. FIG. 6 (b) is a graph showing leakage fluxes generated within a core in an AC section. In FIG. 6 (b), the ordinate axis shows the magnitude of a leakage magnetic flux F.

In transformer 51, low voltage side coils 4A and 4B are arranged at both sides of high voltage side coil 13. Further, high voltage side coil 13 includes separate high voltage side coils 13A and 13B. Such a configuration enables low voltage side coils 4A and 4B to be magnetically loosely coupled.

That is, since there is no overlap between the leakage magnetic fluxes generated in respective low voltage side coils 4A and 4B, i.e. the short-circuit impedances, as shown in FIG. 6 (b), the magnetic interference of low voltage side coils 4A and 4B can be reduced. Consequently, the output of transformer 51 can be stabilized.

An operation of the voltage transforming apparatus according to an embodiment of the present invention in a DC section will now be described. First, description will be made under the assumption that the AC/DC electric railcar according to an embodiment of the present invention does not have switch SW3.

Figure 7:
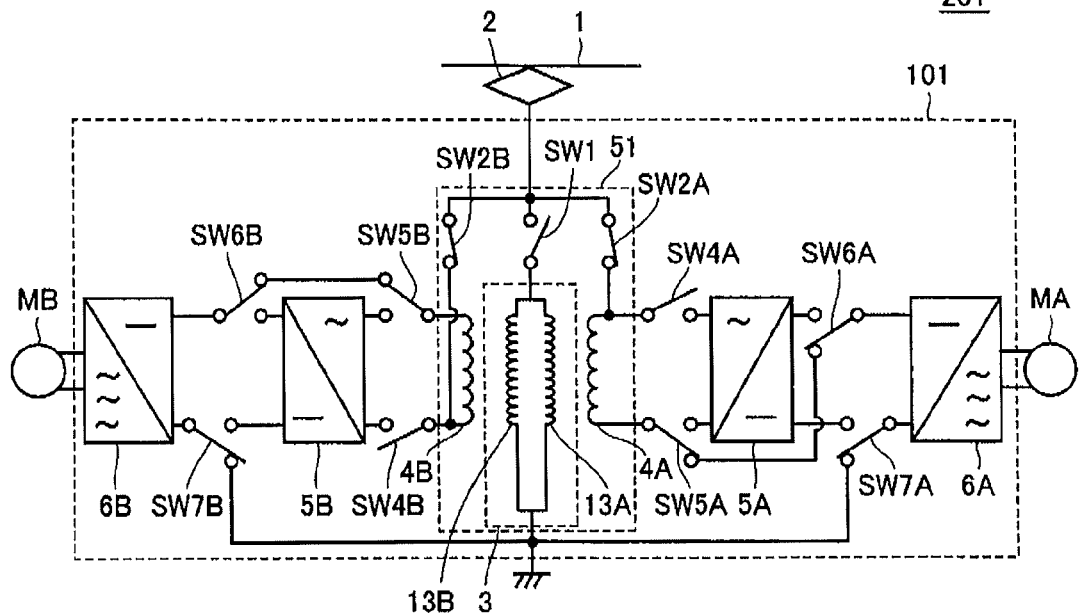
FIG. 7 illustrates settings of each switch in a DC section under the assumption that an AC/DC electric railcar according to an embodiment of the present invention does not have a switch SW3.

FIG. 7 illustrates settings of each switch in a DC section under the assumption that the AC/DC electric railcar according to an embodiment of the present invention does not have switch SW3.

Referring to FIG. 7, in an DC section, switch SW1 turns off, switches SW2A and SW2B turn on, and switches SW4A and SW4B turn off. Further, the first terminals and the third terminals of switches SW5A and SW5B are respectively connected. Further, the second terminals and the third terminals of switches SW6A, SW6B, SW7A, and SW7B are respectively connected.

Figure 8:
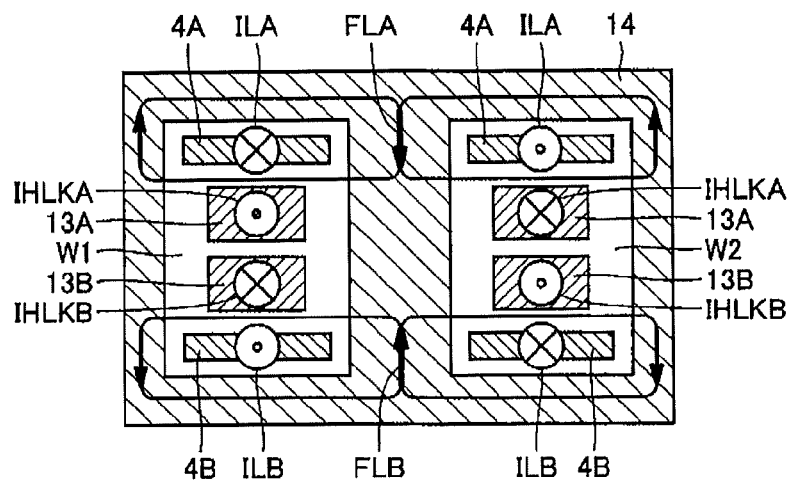
FIG. 8 is a sectional view of a transformer illustrating current and magnetic fluxes generated in a DC section.

FIG. 8 is a sectional view of a transformer illustrating current and magnetic fluxes generated in a DC section.

Referring to FIGS. 7 and 8, first, a DC voltage is supplied from overhead wire 1 to pantograph 2. The DC voltage supplied from overhead wire 1 is applied to low voltage side coils 4A and 4B via pantograph 2 and switches SW2A and SW2B, respectively. Then, DC current ILA flows through low voltage side coil 4A, and this DC current ILA causes main magnetic flux FLA to be generated within core 14. Further, DC current ILB flows through low voltage side coil 4B, and this DC current ILB cause main magnetic flux FLB to be generated within core 14.

Here, the second end of switch SW2A is connected to the first end of low voltage side coil 4A, and the second end of switch SW2B is connected to the second end of low voltage side coil 4B. Accordingly, the direction of current ILA flowing through low voltage side coil 4A when a voltage is supplied via switch SW2A and the direction of current ILB flowing through low voltage side coil 4B when a voltage is supplied via switch SW2B are opposite. That is, magnetic flux FLA generated by current ILA flowing through low voltage side coil 4A and magnetic flux FLB generated by current ILB flowing through low voltage side coils 4B cancel each other out. Since such a configuration can prevent magnetic saturation of core 14, the leakage magnetic flux can be reduced.

Figure 9:
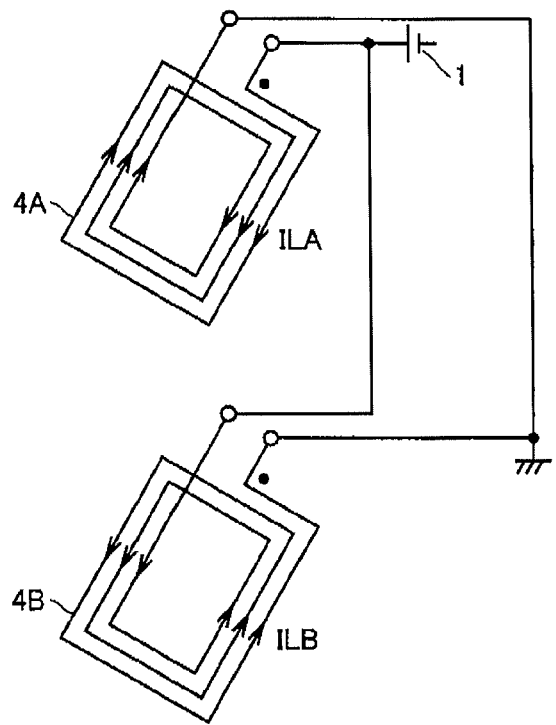
FIG. 9 schematically illustrates the direction of current flowing through low voltage side coils due to a DC voltage supplied from an overhead wire in a DC section.

FIG. 9 schematically illustrates the direction of current flowing through a low voltage side coil due to a DC voltage supplied from an overhead wire in a DC section. FIG. 9 illustrates the case where low voltage side coils 4A and 4B have the same winding direction.

Figure 10:
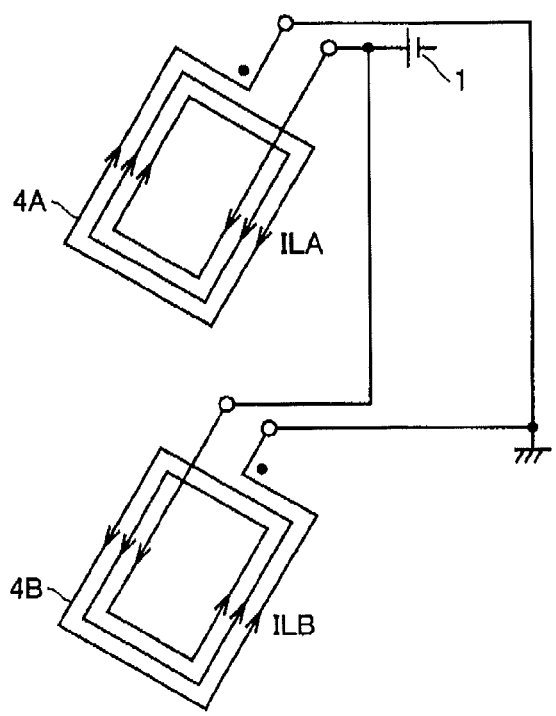
FIG. 10 schematically illustrates the direction of current flowing through low voltage side coils due to a DC voltage supplied from the overhead wire in a DC section.

FIG. 10 schematically illustrates the direction of current flowing through a low voltage side coil due to a DC voltage supplied from the overhead wire in a DC section. FIG. 10 illustrates the case where low voltage side coils 4A and 4B have the opposite winding directions.

In either cases of FIGS. 9 and 10, low voltage side coils 4A and 4B are provided such that the magnetic flux generated by current ILA flowing through low voltage side coil 4A when a voltage is supplied from overhead wire 1 via switch SW2A and the magnetic flux generated by current ILB flowing through low voltage side coil 4B when a voltage is supplied from overhead wire 1 via switch SW2B cancel each other out.

Then, the DC voltage applied to low voltage side coil 4A is supplied to inverter 6A via switches SW5A and SW6A. Further, the DC voltage applied to low voltage side coil 4B is supplied to inverter 6B via switches SW5B and SW6B.

Inverter 6A converts the DC voltage received from low voltage side coil 4A into a three-phase AC voltage, and outputs it to motor MA. Further, inverter 6B converts the DC voltage received from low voltage side coil 4B into a three-phase AC voltage, and outputs it to motor MB.

Motor MA rotates based on the three-phase AC voltage received from inverter 6A. Further, motor MB rotates based on the three-phase AC voltage received from inverter 6B.

Figure 11:
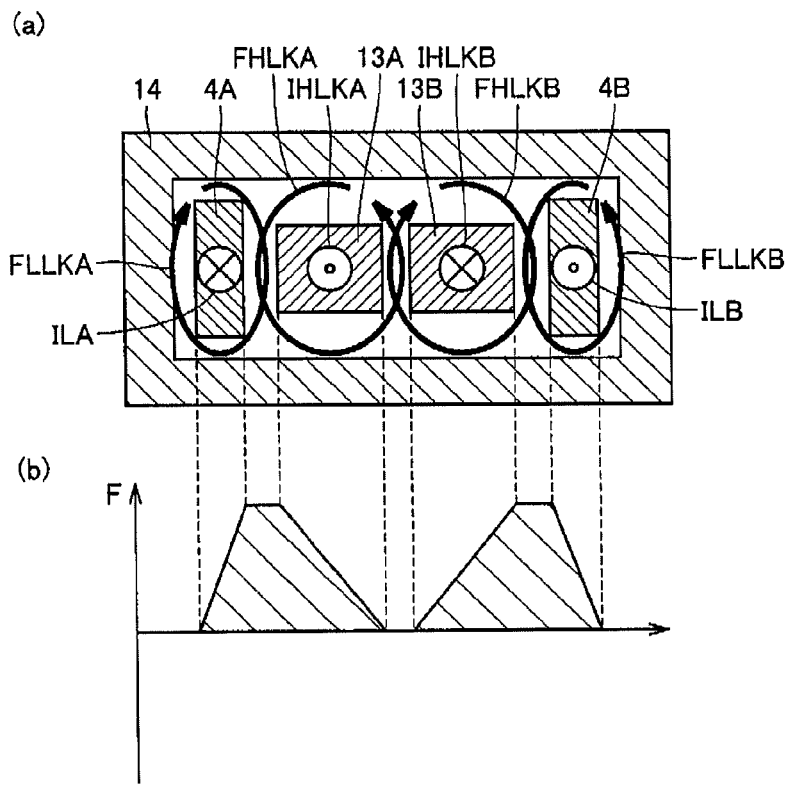
FIG. 11 (a) is a sectional view of a window portion of a transformer illustrating current and magnetic fluxes generated in a DC section.

FIG. 11 (a) is a sectional view of a window portion of a transformer illustrating current and magnetic fluxes generated in a DC section. FIG. 11 (b) is a graph showing leakage fluxes generated within a core in a DC section. In FIG. 11 (b), the ordinate axis shows the magnitude of leakage magnetic flux F.

When DC current flows through low voltage side coils 4A and 4B, no inductance is generated because there is no change in the generated main magnetic fluxes FLA and FLB. When, however, the DC current flowing through low voltage side coils 4A and 4B includes a pulsating current component, i.e. an AC component, leakage magnetic flux F as shown in FIG. 11 (b) is generated within core 14, and thus a inductance can be obtained. That is, the AC component included in the DC current flowing through low voltage side coils 4A and 4B can be attenuated. Further, a harmonic component that is generated when voltage transforming apparatus 101 operates as an inverter, i.e. generates a three-phase AC power from DC power, can be attenuated.

The voltage transforming apparatus illustrated in FIG. 7, however, is configured with no switch SW3. Consequently, a closed circuit including parallel-connected high voltage side coils 13A and 13B is formed. Then, a leakage magnetic flux FLLKA that is generated by the AC component of current flowing through low voltage side coil 4A, causes current IHLKA to flow through high voltage side coil 13A, as shown in FIG. 11 (a). Further, a leakage magnetic flux FLLKB that is generated by the AC component of current flowing through low voltage side coil 4B, causes current IHLKB to flow through high voltage side coil 13B.

Then, these currents IHLKA and IHLKB cause leakage magnetic fluxes FHLKA and FHLKB to be generated, respectively. Then, since these leakage magnetic fluxes FHLKA and FHLKB cancel out leakage magnetic fluxes FLLKA and FLLKB, respectively, the inductance in low voltage side coils 4A and 4B is decreased.

Thus, in the voltage transforming apparatus according to an embodiment of the present invention, a configuration with switch SW3 solves the problems as noted above.

Figure 12:
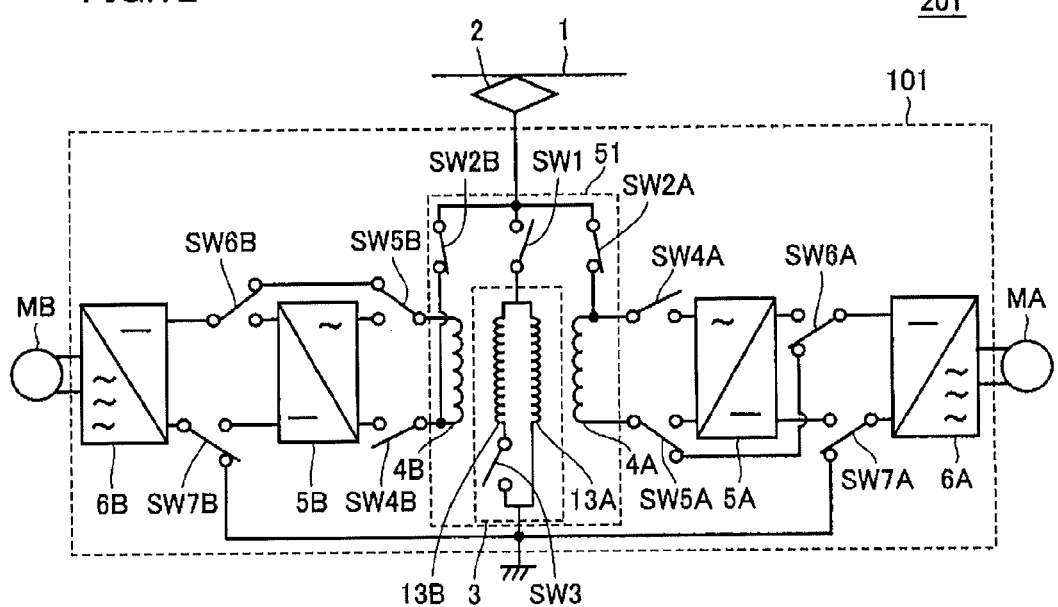
FIG. 12 illustrates settings of each switch in a DC section of an AC/DC electric railcar according to an embodiment of the present invention.

FIG. 12 illustrates settings of each switch in a DC section of an AC/DC electric railcar according to an embodiment of the present invention.

Figure 13:
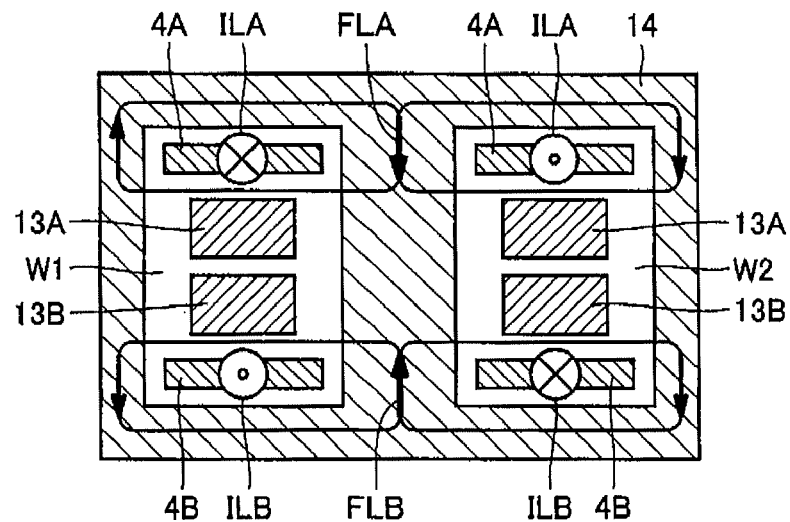
FIG. 13 is a sectional view of a transformer illustrating current and magnetic fluxes generated in a DC section.
Figure 14:
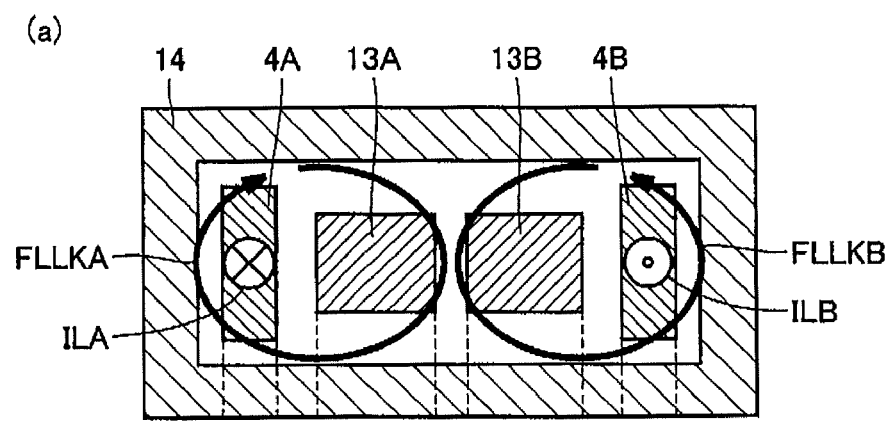
FIG. 14 (a) is a sectional view of a window portion of a transformer illustrating current and magnetic fluxes generated in a DC section.
Figure 14:
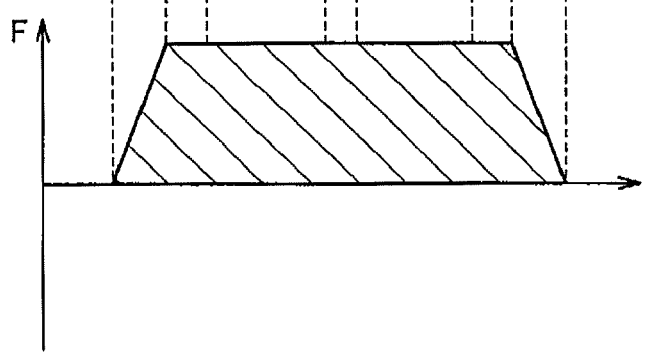

FIG. 13 is a sectional view of a transformer illustrating current and magnetic fluxes generated in a DC section. FIG. 14 (a) is a sectional view of a window portion of a transformer illustrating current and magnetic fluxes generated in a DC section. FIG. 14 (b) is a graph showing leakage fluxes generated within a core in a DC section. In FIG. 14 (b), the ordinate axis shows the magnitude of leakage magnetic flux F.

Referring to FIGS. 12-14, in a DC section, switch SW3 turns off. This causes the parallel connection between high voltage side coils 13A and 13B to be released, and the closed circuit including high voltage side coil 13A and high voltage side coil 13B will not be formed. Then, the flowing of current IHLKA and IHLKB through high voltage side coils 13A and 13B, which is caused by leakage magnetic fluxes FLLKA and FLLKB generated in low voltage side coils 4A and 4B, can be prevented. That is, since the generation of leakage magnetic flexes FHLKA and FHLKB in high voltage side coils 13A and 13B can be prevented, leakage magnetic fluxes FLLKA and FLLKB can be prevented from being canceled out, and a large inductance can be obtained in low voltage side coils 4A and 4B.

Figure 15:
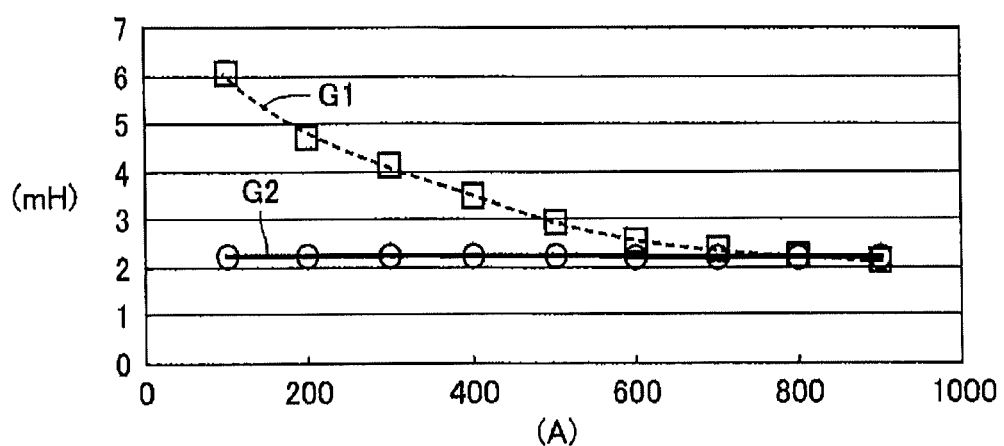
FIG. 15 is a graph showing current dependency of an inductance.

FIG. 15 is a graph showing current dependency of an inductance.

A graph G1 shows the case where magnetic saturation occurred in the core. In graph G1, the inductance has changed depending on the change in current flowing through low voltage side coils 4A and 4B.

In transformer 51, a pulsating current component in current flowing through low voltage side coils 4A and 4B, i.e. AC current causes a magnetic flux to be generated. Since such a configuration does not change the generated magnetic flux in response to the change in the DC current flowing through low voltage side coils 4A and 4B, a stable inductance as shown in a graph G2 can be obtained.

Meanwhile, in an AC/DC electric railcar, an apparatus for an AC section, such as a transformer and an apparatus for a DC section, such as a reactor are both needed, however, there may be the difficulty in equipping the AC/DC electric railcar with both of the apparatuses in the limited space, such as under the floor of a carbody.

In a voltage transforming apparatus according to an embodiment of the present invention, however, several switches are added to a transformer for an AC section to enable a low voltage side coil to also be used as a DC reactor. Therefore, there is no need to arrange a reactor apparatus singly and separately from the transformer, and a reduction in the size can be achieved. Furthermore, in a voltage transforming apparatus according to an embodiment of the present invention, low voltage side coil 4A and low voltage side coil 4B are provided such that a magnetic flux generated by current flowing through low voltage side coil 4A when a voltage is supplied from overhead wire 1 via switch SW2A and a magnetic flux generated by current flowing through low voltage side coil 4B when a voltage is supplied from overhead wire 1 via switch SW2B cancel each other out. Since such a construction can prevent a magnetic saturation of core 14 in a DC section, a steady output can be obtained. Further, since it is unnecessary to take measures to reduce leakage magnetic fluxes into a carbody of an AC/DC electric railcar, a reduction in the weight and the cost of an AC/DC electric railcar can be achieved.

Therefore, in an AC/DC electric rail car, a voltage transforming apparatus according to an embodiment of the present invention operates in an AC section as a transformer, which is an apparatus for an AC section, and operates in a DC section as a reactor, which is an apparatus for a DC section, thereby to enable the equipping space of a carbody to be reduced. Further, a stable output can be obtained both in a DC section and in an AC section.

It should be construed that embodiments disclosed herein are by way of illustration in all respects, not by way of limitation. It is intended that the scope of the present invention is defined by claims, not by the above description, and includes all modifications equivalent in meaning and scope to the claims.

The invention claimed is:

1. A voltage transforming apparatus, comprising:
   a first high voltage side coil;
   a first low voltage side coil magnetically coupled to said first high voltage side coil;
   a second low voltage side coil magnetically coupled to said first high voltage side coil; and
   a first switch switching an externally supplied voltage between being supplied to said first low voltage side coil and said second low voltage side coil and being supplied to said first high voltage side coil,
   said first low voltage side coil and said second low voltage side coil being provided such that a magnetic flux generated by current flowing through said first low voltage side coil and a magnetic flux generated by current flowing through said second low voltage side coil cancel each other out, when a voltage is supplied via said first switch.

2. The voltage transforming apparatus according to claim 1, wherein
   said first high voltage side coil includes:
   a second high voltage side coil provided at a position between said first low voltage side coil and said second low voltage side coil and opposite to said first low voltage side coil, and magnetically coupled to said first low voltage side coil; and
   a third high voltage side coil connected in parallel to said second high voltage side coil, provided at a position between said first low voltage side coil and said second low voltage side coil and opposite to said second low voltage side coil, and magnetically coupled to said second low voltage side coil.

3. The voltage transforming apparatus according to claim 2, further comprising a second switch connected between said second high voltage side coil and said third high voltage side coil.

4. The voltage transforming apparatus according to claim 1, further comprising a core having a first side, a second side opposite to said first side, and two window portions passing through from said first side to said second side, wherein
   said first high voltage side coil, said first low voltage side coil, and said second low voltage side coil are provided to run through said two window portions.

5. The voltage transforming apparatus according to claim 1, further comprising:
   a first converter converting an AC voltage appearing on said first low voltage side coil into a DC voltage;
   a second converter converting an AC voltage appearing on said second low voltage side coil into a DC voltage;
   a third switch switching between connection and disconnection of said first low voltage side coil and said first converter; and
   a fourth switch switching between connection and disconnection of said second low voltage side coil and said second converter.

6. The voltage transforming apparatus according to claim 5, further comprising;
   a first inverter converting a received DC voltage into an AC voltage; and
   a second inverter converting a received DC voltage into an AC voltage; wherein
   said third switch switches said first low voltage side coil between being connected to said first converter and being connected to said first inverter,
   said fourth switch switches said second low voltage side coil between being connected to said second converter and being connected to said second inverter.

* * * * *